United States Patent
Imbe et al.

(10) Patent No.: US 8,728,557 B2
(45) Date of Patent: May 20, 2014

(54) FRUIT-JUICE-CONTAINING BLACK TEA BEVERAGE PACKED IN A CONTAINER AND METHOD FOR PRODUCING SAME

(75) Inventors: Toyo Imbe, Makinohara (JP); Keisuke Numata, Makinohara (JP); Yu Kanda, Makinohara (JP); Kinya Kodera, Tokyo (JP)

(73) Assignee: Ito En, Ltd., Tokyo (JP)

( * ) Notice: Subject to any disclaimer, the term of this patent is extended or adjusted under 35 U.S.C. 154(b) by 76 days.

(21) Appl. No.: 13/575,230

(22) PCT Filed: Dec. 22, 2010

(86) PCT No.: PCT/JP2010/073103
§ 371 (c)(1),
(2), (4) Date: Jul. 25, 2012

(87) PCT Pub. No.: WO2011/092975
PCT Pub. Date: Aug. 4, 2011

(65) Prior Publication Data
US 2012/0294995 A1 Nov. 22, 2012

(30) Foreign Application Priority Data

Jan. 29, 2010 (JP) ................................. 2010-019774

(51) Int. Cl.
*A23L 2/00* (2006.01)
(52) U.S. Cl.
USPC ........... 426/597; 426/433; 426/435; 426/590; 426/599
(58) Field of Classification Search
CPC .............. A23L 2/02; A23F 3/40; A23F 3/405
USPC .......................... 426/433, 435, 590, 597, 599
See application file for complete search history.

(56) References Cited

U.S. PATENT DOCUMENTS

| | | | |
|---|---|---|---|
| 2007/0128327 A1* | 6/2007 | Takashima et al. | 426/597 |
| 2010/0040762 A1* | 2/2010 | Kler et al. | 426/655 |
| 2010/0316770 A1* | 12/2010 | Fukuda et al. | 426/72 |

FOREIGN PATENT DOCUMENTS

| | | |
|---|---|---|
| JP | 2000-037164 A | 2/2000 |
| JP | 3615213 B1 | 11/2004 |
| JP | 2005-058210 A | 3/2005 |
| JP | 2005 058210 A | 3/2005 |
| JP | 2006-166770 A | 6/2006 |
| JP | 2006-197934 A | 8/2006 |
| JP | 2006-325470 A | 12/2006 |
| JP | 2006-333768 A | 12/2006 |
| JP | 2006 333769 A | 12/2006 |
| JP | 2006-333769 A | 12/2006 |
| JP | 2006-340644 A | 12/2006 |
| JP | 2008-000044 A | 1/2008 |
| WO | WO 2008081583 A1 * | 7/2008 |

OTHER PUBLICATIONS

WO2008037417, Kler et al. Apr. 3, 2008, Machine Translation.*
Neilson, Andrew P. et al., "High-Throughput Analysis of Catechins and Theaflavins by High Performance Liquid Chromatography with Diode Array Detection," Journal of Chromatography A, Nov. 3, 2006, vol. 1132, Issues 1-2, p. 132, abstract.
"Black-tea Bland Born in NY," Kumamoto Nichinichi Shimbun (Morning Newspaper), Aug. 4, 2009, p. 7.
International Search Report in PCT/JP2010/073103 dated Mar. 29, 2011.
Neilson, Andrew P. et al., "High-Throughput Analysis of Catechins an Theaflavins by High Performance Liquid Chromatography with Diode Array Detection," Journal of Chromatography A, Nov. 3, 2006, vol. 1132, Issues 1-2, p. 321, abstract.
News release, "Collaboration of Information Program 'King's Branch' and Kirin Beverage 'Kirin Afternoon Tea of 50% fruit juice'" now on sale on Apr. 21, dated Apr. 8, 2009, 2 pages, http://www.beverage.co.jp/company/news/page/news2009040801.html>.
Notice of Allowance in Japanese Patent Application No. 2010-019774 dated Oct. 5, 2011.

* cited by examiner

*Primary Examiner* — Helen F Heggestad
(74) *Attorney, Agent, or Firm* — Foley & Lardner LLP

(57) ABSTRACT

Disclosed is a new fruit-juice-containing black tea beverage that, without performing enzyme treatment such as tannase treatment, and moreover even if a large quantity of fruit juice is added, can suppress time degradation. The fruit-juice-containing black tea beverage packed in a container containing 10-90 mass % of fruit juice is characterized by containing 10-24 ppm of theogallin, and by the ratio (theogallin/K) of contained theogallin to contained potassium being 0.015-0.100.

6 Claims, No Drawings

FRUIT-JUICE-CONTAINING BLACK TEA BEVERAGE PACKED IN A CONTAINER AND METHOD FOR PRODUCING SAME

RELATED APPLICATIONS

This application is a U.S. National Phase of PCT/JP2010/073103, filed Dec. 22, 2010, which claims priority from Japanese Patent Application No. 2010-019774, filed Jan. 29, 2010.

TECHNICAL FIELD

The present invention relates to a fruit-juice-containing black tea beverage packed in a container that contains fruit juice, particularly a fruit-juice-containing black tea beverage packed in a container that contains a high amount of the fruit juice, and a method for producing the same.

BACKGROUND ART

A black tea is a fermented tea, differently from a non-fermented tea such as a green tea, and thus has different components and features from those of a green tea and the like. For example, catechins, which are largely contained in a green tea, go through polymerization by oxidation action from fermentation, whereby to produce theaflavin (orange color pigment and astringent taste) and thearubigin (red pigment). In addition, components called proanthocyanidin polymers form astringent taste and bitter taste, and along with added theanine (sweetness and deliciousness) and caffeine, form unique tastes of a black tea.

A fruit-juice-containing black tea beverage in which fruit juice is added to a black tea, has been preferred and drunk from the past due to appropriate astringent taste from a black tea and refreshing feeling from fruit juice or acidic ingredients.

However, such fruit-juice-containing black tea beverage has problems such that time deterioration, for example, convergent taste strongly sensed after long time storage, or browning and the like, occurs easily in accordance with interaction between components of the black tea and the components of the fruit juice.

Therefore, in the past, in order to suppress such time deterioration, a method has been adopted of alleviating the astringent taste or suppressing turbidity or precipitation by reducing the amount of fruit juice added to a black tea beverage, or performing tannase treatment for an extraction liquid of black tea, or performing chlorogenic acid esterase treatment for fruit juice added to a black tea (for example, see Patent Document 1).

CITATION LIST

Patent Document

Patent Document 1: JP 2000-37164 A

DISCLOSURE OF THE INVENTION

Problem to be Solved by the Invention

As described above, in the past, in order to suppress time deterioration of a fruit-juice-containing black tea beverage, conducted was reducing the amount of fruit juice added to a black tea beverage, or performing tannase treatment for an extraction liquid of black tea, or performing chlorogenic acid esterase treatment for fruit juice added to a black tea. However, in any of the cases, there was a problem that the taste of black tea (feeling of black tea) or the flavor of fruit juice (feeling of fruit juice) was harmed. In addition, there was also a problem that the production cost increases if enzyme treatment such as tannase treatment is performed.

Therefore, the invention provides a new fruit-juice-containing black tea beverage that can suppress time deterioration even with large addition of fruit juice without performing enzyme treatment such as tannase treatment.

Means for Solving Problem

The invention suggests a fruit-juice-containing black tea beverage packed in a container that contains 10 to 90 mass % of fruit juice, 10 ppm to 24 ppm of theogallin and has a ratio of the content of theogallin with respect to the content of potassium (theogallin/K) being 0.015 to 0.100.

As described above, prescribing the amount of theogallin contained in such black tea beverage packed in a container to a range of 10 ppm to 24 ppm, and prescribing the ratio of the content of theogallin with respect to the content of potassium (theogallin/K) to 0.015 to 0.100 allow the beverage to suppress time deterioration, and have the taste of black tea (feeling of black tea) and the flavor of fruit juice (feeling of fruit juice) sufficiently without performing enzyme treatment such as tannase treatment even if the beverage contains 10 to 90 mass % of fruit juice.

BEST MODE(S) FOR CARRYING OUT THE INVENTION

Hereinafter, an illustrative embodiment of the invention will be described, but the scope of the invention is not limited to the illustrative embodiment.

<Present Black Tea Beverage>

A fruit-juice-containing black tea beverage packed in a container according to the present illustrative embodiment (hereinafter, referred to as "the present black tea beverage") is a fruit-juice-containing black tea beverage packed in a container that contains 10 to 90 mass % of fruit juice, and fruit-juice-containing black tea beverage packed in a container has the content of theogallin within the given range and the ratio of the content of theogallin with respect to the content of potassium (theogallin/K) within the given range.

The present black tea beverage is a black tea beverage packed in a container that contains an extraction liquid of black tea (including an extract), fruit juice, and other additives.

(Extraction Liquid of Black Tea)

An extraction liquid of black tea can be obtained by, for example, immersing black tea leaves in a fluid for extraction, stirring, and then removing the black tea leaves by a solid-liquid separation unit.

However, a commercially available extraction liquid of black tea (including an extract) may be also used.

The black tea leaves for the extraction liquid of black tea may be black tea leaves that are generally used in a black tea beverage, in other words, black tea leaves obtained by fermenting live tea leaves and producing a tea.

A kind of the black tea such as tea season or shape and production area of the black tea is not particularly limited, but in the present black tea beverage, the kind of the black tea is preferably selected particularly for the purpose of adjusting theogallin amount to a desired range. For example, tea leaves having a large leaf tend to have a large content of theogallin. For example, Darjeeling, Nilgiri, and the like are tea leaves having a high content of theogallin. Reversely, Uva, Dimbula, and the like are tea leaves having a small content of theogallin. Accordingly, on the basis of such viewpoint, the content of theogallin may be adjusted to a desired content of theogallin by selecting a kind of tea leaves, and mixing multiple kinds of tea leaves as necessary.

Extraction of black tea leaves may be conducted, for example, by performing extraction at normal pressures in accordance with an ordinary method using an extracting equipment called a kneader with hot water of 10 to 100° C. in an amount of 5 to 100 folds with respect to a raw tea for about 1 minute to 40 minutes, with stirring once to several times as necessary.

Furthermore, the extraction is performed preferably at 10 to 90° C., more preferably 20 to 80° C., and preferably 30 to 70° C. from a viewpoint of appropriate flavor and preventing fluid color change for the target of the content of theogallin.

However, the extraction method, the extraction conditions, and the like are not particularly limited, and for example, pressurization extraction may be also performed.

The hot water used in the extraction liquid may be exemplified by pure water, hard water, soft water, ion exchanged water, natural water, and the like, and in addition, an aqueous solution that contains ascorbic acid, pH preparation water, and the like.

To the fluid for extraction, organic acid such as sodium ascorbate or organic acid salts may be also added.

The solid-liquid separation after the extraction may be performed by filtration, centrifugation, and the like, and the black tea leaves are removed whereby to obtain an extraction liquid of black tea. For example, a filtration method that is presently adopted in order to remove extraction residues such as a stainless-steel filter, a flannel cloth, a strainer, and the like, may be arbitrarily adopted. In addition, as necessary, further centrifugation or diatomaceous earth filtration may be also performed.

(Fruit Juice)

The kind of the fruit juice added to the present black tea beverage is not particularly limited. Examples of the fruit juice include, for example, orange, peach, white grape, apple, lemon, strawberry, grapefruit, mango, pear, red grape, mandarin orange, cherry fruit, Citrus tamurana, and the like. The kind and the content thereof are preferably selected for the purpose of particularly adjusting the amount of potassium and the amount of magnesium to desired ranges in the present black tea beverage.

Examples of the fruit juice having a high content of potassium include, for example, orange, peach, and the like, and examples of the fruit juice having a low content of potassium include, for example, white grape and the like. Examples of the fruit juice having a high content of magnesium include, for example, strawberry, grapefruit, peach, and the like, and examples of the fruit juice having a low content of magnesium include, for example, apple, white grape, and the like. Accordingly, the amount of potassium and the amount of magnesium may be adjusted to desired amounts by selecting the kind and the content of fruit juices, and mixing multiple kinds as necessary.

Furthermore, the fruit juice is preferably selected in consideration of compatibility of the kind of black tea leaves and the fruit juice, and compatibility of the fruit juices combined to each other.

(Amount of Fruit Juice)

It is important that the amount of the fruit juice (in compliance with Japanese agricultural standards (JAS)) in the present black tea beverage is 10 to 90 mass %.

The present invention solves unique problems of a fruit-juice-containing black tea beverage that largely contains fruit juice. In other words, according to the invention, it is possible to solve problems such as noticeable change of color with age when the black tea beverage contains 10 mass % or more of fruit juice.

However, the amount of the fruit juice in the present black tea beverage is preferably 20 mass % or more and 80 mass % or less, and particularly more preferably 30 mass % or more and 70 mass % or less in a point of full-scale flavor of fruit juice, compatibility with black tea, and suppression of change of color tone with age.

(Brix of Fruit Juice/Brix of Black Tea)

The Brix of fruit juice/Brix of black tea in the present black tea beverage is preferably 6 to 90. When the Brix of fruit juice/Brix of black tea is 6 or more, it is preferable in a point of appropriate feeling of black tea. On the other hand, when the Brix of fruit juice/Brix of black tea is 90 or less, it is preferable in a point of appropriate feeling of fruit juice and suppression of change of color tone with age.

Accordingly, from such viewpoint, the Brix of fruit juice/Brix of black tea in the present black tea beverage is preferably 6 to 90, particularly 14 or more and 50 or less and further particularly preferably 20 or more and 35 or less.

Furthermore, the Brix of fruit juice of the present black tea beverage may be adjusted with the kind and the content of fruit juice, and the Brix of black tea may be adjusted with the kind of tea leaves, extraction temperature, extraction time, and the like.

(Content of Theogallin)

Theogallin (3-galloylquinic acid) presents the astringent taste-like taste, and has a large influence on formation of full-scale black tea-like flavor.

It is important that the content of theogallin in the present black tea beverage is 10 ppm to 24 ppm. When the content of theogallin is 10 ppm or more, the present black tea beverage has appropriate astringent taste, and can have full-scale feeling of black tea in spite of a large content of fruit juice, and has no outstanding feeling of fruit juice only. On the other hand, when the content of theogallin is 24 ppm or less, it is preferable in a point of having no outstanding feeling of black tea from too strong astringent taste.

From such viewpoint, the content of theogallin is importantly 10 ppm to 24 ppm, preferably 12 ppm or more and 18 ppm or less, and further preferably 13 ppm or more and 15 ppm or less.

The content of theogallin may be arbitrarily adjusted with selection and extraction of tea leaves.

The tea leaves selected as described above may be used alone or arbitrarily in combination, to adjust the content of theogallin.

In addition, the content of theogallin may be also adjusted with an extraction method and extraction conditions. For example, the content of theogallin may be adjusted with adjustment of extraction temperature.

Furthermore, the content of theogallin may be also adjusted with addition of naturally-derived theogallin.

(Content of Potassium)

The content of potassium in the present black tea beverage is preferably 120 ppm to 1500 ppm. When the content of potassium is 120 ppm or more, full-scale feeling of fruit juice can be sensed. On the other hand, when the content of potassium is 1500 ppm or less, feeling of black tea is not harmed.

Accordingly, from such viewpoint, the content of potassium is preferably 120 ppm to 1500 ppm, particularly 190 ppm or more and 700 ppm or less and further particularly preferably 300 ppm or more and 480 ppm or less.

The content of potassium may be adjusted with the kind of the fruit juice and the amount thereof since the kind of the fruit juice has a large influence as described above. In addition, the content of potassium may be adjusted with addition of purified potassium.

(Ratio of Theogallin/Potassium)

Adjustment of the ratio of the content of theogallin with respect to the content of potassium is important from a viewpoint of maintaining a balance of flavors and lessening change of fluid color with age in the present black tea beverage.

In other words, it is important that the ratio of the content of theogallin with respect to the content of potassium (theogallin/K) is 0.015 to 0.100 in the present black tea beverage.

When the theogallin/K in the present black tea beverage is 0.015 to 0.100, it is possible to maintain a balance of flavors, and suppress fluid color change with age.

From such viewpoint, the ratio of the content of theogallin with respect to the content of potassium (theogallin/K) in the present black tea beverage is importantly 0.015 to 0.100, particularly 0.020 or more and 0.070 or less, and particularly preferably 0.030 or more and 0.050 or less.

(Content of Magnesium)

The content of magnesium in the present black tea beverage is preferably 10 ppm to 40 ppm. When the content of magnesium in the present black tea beverage is 10 ppm or more, the black tea beverage has good odor note, and has no watery impression. On the other hand, when the content of magnesium is 40 ppm or less, the black tea beverage has no lack of odor note, and also has no deteriorated aftertaste.

Accordingly, from such viewpoint, the content of magnesium in the present black tea beverage is preferably 10 ppm to 40 ppm, particularly 15 ppm or more and 25 ppm or less, and further particularly preferably 17 ppm or more and 20 ppm or less.

The content of magnesium may be adjusted with the content of fruit juice and the kind thereof since the content of fruit juice has a large influence as described above. In addition, the content of magnesium may be also adjusted with addition of purified magnesium.

(Ratio of Theogallin/Magnesium)

The ratio of the content of theogallin with respect to the content of magnesium in the present black tea beverage is further preferably adjusted from a viewpoint of maintaining a balance of flavors, and lessening change of flavor with age.

In other words, the ratio of the content of theogallin with respect to the content of magnesium (theogallin/Mg) in the present black tea beverage is preferably 0.4 to 1.7.

When the theogallin/Mg is 0.4 to 1.7 in the present black tea beverage, it is possible to maintain a balance of flavors, and further suppress change of flavor with age.

From such viewpoint, the ratio of the content of theogallin with respect to the content of magnesium (theogallin/Mg) in the present black tea beverage is preferably 0.4 to 1.7, particularly 0.5 or more and 1.2 or less, and further particularly preferably 0.6 or more and 0.9 or less.

(Content of Theaflavins)

The content of theaflavins in the present black tea beverage is preferably 2 ppm to 10 ppm. When the content of theaflavins in the present black tea beverage is 2 ppm or more, it is preferable in a point of change of color tone with age, and appropriate taste of black tea. On the other hand, when the content of theaflavins in the present black tea beverage is 10 ppm or less, it is preferable in a point of suppressing the change of color tone with age, and obtaining a balance of the black tea and the fruit juice.

Accordingly, from such viewpoint, the content of theaflavins in the present black tea beverage is preferably 2 ppm to 10 ppm, particularly 4 ppm or more and 8 ppm or less, and further particularly preferably 6 ppm or more and 7 ppm or less.

Furthermore, the content of theaflavins may be adjusted with the kind of tea leaves, extraction temperature, extraction time, and the like.

(Ratio of Theogallin/Theaflavins)

The ratio of the content of theogallin with respect to the content of theaflavins in the present black tea beverage is further preferably adjusted from a viewpoint of appropriate astringent taste and the flavor of the black tea, and suppression of the change of color tone with age.

In other words, the ratio of the content of theogallin with respect to the content of theaflavins (theogallin/theaflavins) in the present black tea beverage is preferably 1 to 15. When the ratio of theogallin/theaflavins in the present black tea beverage is 1 to 15, it is possible to obtain appropriate feeling of black tea and lessen the change of color tone with age.

From such viewpoint, the ratio of the content of theogallin with respect to the content of theaflavins (theogallin/theaflavins) in the present black tea beverage is preferably 1 to 15, particularly 1.5 or more and 5 or less and further particularly preferably 1.85 or more and 2.5 or less.

(Specific Gravity)

The specific gravity in the present black tea beverage is preferably 1.019 to 1.074. When the specific gravity in the present black tea beverage is 1.019 or more, it is preferable that sweet taste and full-scale feeling of fruit juice can be obtained. On the other hand, when the specific gravity of the present black tea beverage is 1.074 or less, it is preferable that a flavor without too strong sweet taste can be obtained.

Accordingly, from such viewpoint, the specific gravity in the present black tea beverage is preferably 1.019 to 1.074, particularly 1.032 or more and 1.061 or less, and further particularly preferably 1.036 or more and 1.053 or less.

Furthermore, the specific gravity of the present black tea beverage may be adjusted with the kind of the fruit juice, the content of fruit juice, and the amount of sugars.

(Bx)

Brix (Bx) in the present black tea beverage is preferably 5% to 180. When Brix (Bx) of the present black tea beverage is 50 or more, it is preferable that sweet taste and full-scale feeling of fruit juice can be obtained. On the other hand, when Brix (Bx) in the present black tea beverage is 18% or less, it is preferable that a flavor without too strong sweet taste can be obtained.

Accordingly, from such a viewpoint, Bx in the present black tea beverage is preferably 5% to 18%, particularly 8% or more and 15% or less, and further particularly preferably 9% or more and 13% or less.

Furthermore, Bx of the present black tea beverage may be adjusted with the kind of fruit juice, the content of fruit juice, and the amount of sugars.

<Manufacturing Method>

The present black tea beverage can be manufactured by mixing and blending an extraction liquid of black tea (including an extract), fruit juice, and other additives, and filling a container with the blend and sterilizing it.

(Blending)

Blending may be performed by adding any one kind or in combination of two or more kinds of fruit juice and other additives, for example, a sweetener, acidic ingredients, tartaric acid and other materials to be blended, for example, water (pure water, hard water, soft water, ion exchanged water, natural water, and the like), ascorbic acid, sodium ascorbate, sodium bicarbonate, sugars, dextrin, a perfume, an emulsifier, a stabilizer, or other taste raw materials, to an extraction liquid of black tea (including an extract), and mainly adjusting pH, the concentrations and the tastes may be performed.

In the blending, 2 or more kinds of extraction liquids of black tea (including an extract) that are different in the content of theogallin, the content of theaflavins and the solid content derived from the black tea, may be combined and mixed to adjust the content of theogallin, the content of theaflavins and the solid content derived from the black tea.

(Sterilization and Filling a Container)

Examples of the heat sterilization include a method of heating (hot pack), for example, to 95° C., and then performing filling and over-turn sterilization in the case where the beverage is a canned beverage. After the filling, if necessary, it is all right to perform retort sterilization (for example, heat sterilization under suitable pressure (1.2 kg/cm² and the like) at 121° C. for 7 minutes), or perform UHT sterilization (keeping the blended fluid at 120° C. to 150° C. for 1 second to several tens of seconds.) in the case of a plastic bottled beverage.

The container used in the present invention may be a can, a glass bottle, a plastic bottle, or the like which is not particularly limited, but it is preferable that especially a transparent plastic container (PET container) among transparent containers be used.

<Method for Suppressing Change of Color with Age in Fruit-Juice-Containing Black Tea Beverage Packed in a Container>

As described above, by adjusting the content of theogallin to 10 ppm to 24 ppm, and adjusting the ratio of the content of theogallin with respect to the content of potassium (theogallin/K) to 0.015 to 0.100 in the fruit-juice-containing black tea beverage that contains 10 to 90 mass % of fruit juice packed in a container, it is possible to suppress change of color with age in the fruit-juice-containing black tea beverage packed in a container.

<Explanation for Terms>

The "black tea beverage packed in a container" in the present invention means a black tea beverage contained in a container, and also means a black tea beverage that may be drunk without dilution.

In addition, the "theaflavins" represents theaflavin (TF), theaflavin 3-o-gallate (TF3-G), theaflavin 3'-o-gallate (TF3'-G), and theaflavin 3,3'-di-o-gallate (TF3,3'-G), and the amount thereof means a total amount of them.

The "Brix of fruit juice" refers to a sucrose-converted concentration of fruit juice contained in the present black tea beverage.

The "Brix of black tea" refers to a sucrose-converted concentration of black tea that does not contain additives such as vitamin C.

When "X to Y" (X and Y are any number) is expressed in the present specification, means "X or more and Y or less" unless otherwise stated.

EXAMPLES

Hereinafter, the present invention will be further specifically explained with Examples. However, the present invention is not limited to these Examples.

(Amount of Theogallin)

The black tea beverage packed in a container obtained in Examples and Comparative Examples was filtered with 0.2 μm hydrophilic PTFE filter (Nihon Millipore K.K.), and then the amount of theogallin was quantified using UPLC under the conditions described below.

Equipment: ACQUITY UPLC/PDA System (Nihon Waters K.K.),

Mobile Phase (Fluid A): aqueous solution of 0.1% phosphoric acid,

Mobile Phase (Fluid B): acetonitrile,

Gradient: Elution Fluid B 0% (0 minute)→0% (1 minute)→3% (3.5 minutes),

Flow Rate: 0.5 ml/min,

Detection: UV 275 nm,

Sample injection amount: 5

Column temperature: 40° C.

(Amount of Theaflavins)

Quantification of theaflavins was performed in compliance with the method of Andrew P. Nelson et, al. (Andrew P. Nelson, Rodney J. Green, Karl V. Wood, Mario G. Ferruzzi, Journal of Chromatography A, 1132 (2006) 132).

The black tea beverage packed in a container obtained in Examples and Comparative Examples was diluted with 50% acetonitrile, volume-fixed, and then measured with high-performance liquid chromatograph method (HPLC method).

(Amount of Potassium)

The black tea beverage packed in a container obtained in Examples and Comparative Examples was weighted, extracted with 1% hydrochloric acid, and filtered. The filtrate was volume-fixed, and measured with atomic absorption.

(Amount of Magnesium)

The black tea beverage packed in a container obtained in Examples and Comparative Examples was weighted, extracted with 1% nitric acid, and filtered. The filtrate was volume-fixed, and measured with ICP emission analysis.

(Specific Gravity)

From the Brix of the black tea beverage packed in a container obtained in Examples and Comparative Examples, the specific gravity of sugar fluid at a temperature of 20° C. was calculated from a reference material ("Recent Soft drink", p1032, issued by KORHIN-SHA Co & Ltd.).

(Brix of Black Tea (Soluble Solid Content))

Tea leaves only were extracted under the conditions of each of the Examples and Comparative Examples, and filtered (before addition of fruit juice or sugars or acidic ingredients) to obtain an extraction liquid, this extraction liquid was measured with Brix measurement equipment (DD-7 manufactured by ATAGO CO., LTD), and the obtained numerical value was converted to a final mass up amount in each of the Examples and Comparative Examples, and shown in Tables 1A-2B.

(Brix: Refraction Analysis)

The temperature of the measurement equipment was adjusted to the predetermined temperature, and the measurement equipment (refractometer) was calibrated. The black tea beverage packed in a container obtained in Examples and Comparative Examples (sample) was thinly applied onto the prism of the measurement equipment, and Brix was measured (indicated value of the device was recorded).

(pH: Glass Electrode Method)

A pH meter was calibrated using a pH standard solution, and the black tea beverage packed in a container obtained in Examples and Comparative Examples (sample) was collected to a beaker, and the glass electrode of the pH meter was inserted into the sample, and the pH was measured (indicated value of the device was recorded).

Example 1

35 g of black tea (Sri Lanka blend) was added with 1050 mL (30 folds) of pure water, and extracted at 60° C. for 3 minutes. At the time, black tea components were extracted with stirring for 15 seconds every minute, respectively. The obtained extraction liquid of black tea was cooled to 20° C., and then subjected to microfiltration using centrifugation. The obtained filtered extraction liquid of black tea was added with 3 g of vitamin C ("VC"), and 1200 g of peach-concentrated transparent fruit juice (converted to straight), and in addition, added with citric acid, granulated sugar, and sodium bicarbonate to make the pH to 3.8, and further added with log of a perfume, and was diluted with pure water to be 10,000 g.

Such blended black tea beverage was heated to the temperature of 95° C. for sterilization, and then was filled into a PET bottle container and cooled, to obtain the black tea beverage packed in a container (sample).

Examples 2 to 8 and Comparative Examples 1 to 6

The black tea beverage packed in a container (sample) was obtained similarly to the method of Example 1 except that the amount of black tea leaves and the kind and the amount of the fruit juice and the like were changed as shown in Tables 1A-2B.

Furthermore, any amount of the fruit juice is an amount converted to straight.

Example 9

The black tea beverage packed in a container (sample) was obtained similarly to the method of Example 1 except that the extraction liquid of black tea obtained similarly to the method of Example 1, and an extract of black tea (obtained by extracting at 92° C. for 20 minutes, and then cooling, and subjecting to microfiltration, and then concentrating to 15 Brix with use of black tea leaves produced in Sri Lanka) were used as raw materials derived from a black tea, and the kind and the amount of the fruit juice (converted to straight), and the like were changed as shown in Tables 1A-1D.

(Sensory Examination 1)

With respect to the beverages obtained in Examples 1 to 9 and Comparative Examples 1 to 6 (at a temperature of 25° C.), 5 trained examiners (panelists) gave a score in 4-step evaluation of 1 to 4 on the following criteria for 5 items of feeling of fruit juice, feeling of black tea, balance, color tone with age, and total evaluation. The average points of the 5 examiners were evaluated such that "⊚ (double circle)" indicates 3.5 or more, "○ (circle)" indicates 3 or more and less than 3.5, "Δ (triangle)" indicates 2 or more and less than 3, and "x (cross)" indicates 1 or more and less than 2.

=Feeling of Fruit Juice=

The flavor and concentration of fruit juice were evaluated on the following criteria.
4: Particularly good
3: Good
2: Normal
1: Not enough =Feeling of Black Tea=

Degrees of the flavor, the bitter taste and the astringent taste of black tea were evaluated on the following criteria.
4: Particularly good
3: Good
2: Normal
1: Bad =Balance=

The balance of feeling of fruit juice and feeling of black tea was evaluated on the following criteria.
4: Particularly good balance
3: Good balance
2: Normal
1: Bad =Color Tone with Age=

The black tea beverage packed in a container obtained in Examples and Comparative Examples was stored under sunless environment at a temperature of 25° C. and a humidity of 30% for 60 days, and then color change such as browning was visually observed and evaluated by the panelists.
4: Particularly good
3: Good
2: Slightly browning
1: Browning =Total Evaluation=

The total performance as a beverage in consideration of each of the evaluations for the flavor and the change with age was evaluated on the following criteria.
4: Particularly good
3: good
2: Normal
1: No good

TABLE 1

|  | Unit | Example 1 | Example 2 | Example 3 | Example 4 | Example 5 | Example 6 | Example 7 | Example 8 | Example 9 |
|---|---|---|---|---|---|---|---|---|---|---|
| Sri Lanka Blend | mass % | 0.35 | 0.52 | 0.45 |  | 0.45 | 0.42 | 0.45 | 0.48 | 0.27 |
| Darjeeling | mass % |  |  | 0.20 | 0.22 |  |  | 0.08 |  |  |
| Nilgiri | mass % |  |  |  |  | 0.11 |  |  |  |  |
| Extract of black tea | mass % |  |  |  |  |  |  |  |  | 0.007 |
| VC | mass % | 0.03 | 0.03 | 0.03 | 0.03 | 0.03 | 0.03 | 0.03 | 0.03 | 0.03 |
| Citrice acid | mass % | 0.12 | 0.02 | 0.04 | 0.05 | 0.09 | 0.01 | 0.09 | 0.12 | 0.02 |
| Granulated sugar | mass % | 9.64 | 4.60 | 7.30 | 8.17 | 5.70 | 7.86 | 6.00 | 12.20 | 4.60 |
| Sodium bicarbonate | mass % | Adjusted | Adjusted | Adjusted | Adjusted | Adjusted | Adjusted | Adjusted | Adjusted | Adjusted |
| Apple transparent fruit juice | mass % |  | 60.00 |  |  |  |  |  | 20.00 | 60.00 |
| White grape transparent fruit juice | mass % |  |  |  |  | 90.00 |  | 60.00 |  |  |
| Orange transparent fruit juice | mass % |  |  | 30.00 |  |  |  |  |  |  |
| Strawberry transparent fruit juice | mass % |  |  |  |  |  |  |  | 50.00 |  |
| Grapefruit transparent fruit juice | mass % |  |  |  |  |  | 40.00 |  |  |  |

TABLE 1-continued

|  | Unit | Example 1 | Example 2 | Example 3 | Example 4 | Example 5 | Example 6 | Example 7 | Example 8 | Example 9 |
|---|---|---|---|---|---|---|---|---|---|---|
| Mango transparent fruit juice | mass % |  |  |  | 11.00 |  |  |  |  |  |
| Peach transparent fruit juice | mass % | 12.00 |  |  |  |  |  |  |  |  |
| Pear transparent fruit juice | mass % |  |  |  |  |  |  |  |  |  |
| Perfume | mass % | 0.10 | 0.10 | 0.10 | 0.10 | 0.10 | 0.10 | 0.10 | 0.10 | 0.10 |
| Pure water | mass % | Adjusted | Adjusted | Adjusted | Adjusted | Adjusted | Adjusted | Adjusted | Adjusted | Adjusted |
| Total amount | mass % | 100.00 | 100.00 | 100.00 | 100.00 | 100.00 | 100.00 | 100.00 | 100.00 | 100.00 |
| Theogallin | ppm | 10 | 15 | 23 | 11 | 18 | 12 | 17 | 14 | 13 |
| Theaflavins | ppm | 5.3 | 7.8 | 8.6 | 2.0 | 7.9 | 6.3 | 7.5 | 7.2 | 6.5 |
| K | ppm | 172 | 445 | 451 | 112 | 299 | 505 | 199 | 209 | 445 |
| Bx | % | 11 | 11 | 11 | 10 | 16 | 12 | 13 | 15 | 11 |
| Specific gravity |  | 1.044 | 1.044 | 1.044 | 1.044 | 1.065 | 1.048 | 1.053 | 1.061 | 1.044 |
| Brix of fruit juice/Brinx of black tea |  | 7.84 | 32.97 | 14.51 | 21.67 | 51.97 | 24.49 | 36.36 | 14.14 | 33.08 |
| Theogallin/K |  | 0.058 | 0.034 | 0.051 | 0.098 | 0.060 | 0.024 | 0.085 | 0.067 | 0.029 |
| Theogallin/Theaflavins |  | 1.905 | 1.923 | 2.674 | 5.556 | 2.277 | 1.905 | 2.276 | 1.944 | 1.923 |
| Feeling of fruit juice |  | Δ | ◎ | ○ | Δ | ◎ | ○ | ◎ | ○ | ◎ |
| Feeling of black tea |  | Δ | ◎ | Δ | Δ | ○ | ○ | ○ | ◎ | ○ |
| Balance |  | Δ | ◎ | ○ | ○ | ○ | Δ | ○ | ◎ | ○ |
| Color tone with age |  | ◎ | ◎ | ○ | ◎ | Δ | ○ | Δ | ○ | ○ |
| Total evaluation |  | ○ | ◎ | ○ | ○ | ○ | ○ | ○ | ○ | ○ |

TABLE 2

|  | Unit | Comparative Example 1 | Comparative Example 2 | Comparative Example 3 | Comparative Example 4 | Comparative Example 5 | Comparative Example 6 |
|---|---|---|---|---|---|---|---|
| Sri Lanka Blend | mass % | 0.31 | 0.31 | 0.42 | 0.35 | 0.52 | 0.45 |
| Darjeeling | mass % |  |  |  | 0.16 | 0.20 |  |
| Nilgiri | mass % |  |  |  |  |  | 0.30 |
| Extract of black tea | mass % |  |  |  |  |  |  |
| VC | mass % | 0.03 | 0.03 | 0.03 | 0.03 | 0.03 | 0.03 |
| Citric acid | mass % | 0.08 | 0.13 | 0.07 | 0.15 | 0.01 | 0.08 |
| Granulated sugar | mass % | 7.10 | 9.50 | 9.00 | 2.65 | 5.75 | 6.90 |
| Sodium bicarbonate | mass % | Adjusted | Adjusted | Adjusted | Adjusted | Adjusted | Adjusted |
| Apple transparent fruit juice | mass % |  |  |  |  |  | 27.00 |
| White grape transparent fruit juice | mass % |  |  |  | 45.00 |  |  |
| Orange transparent fruit juice | mass % | 50.00 |  |  |  |  |  |
| Strawberry transparent fruit juice | mass % |  |  |  |  |  |  |
| Grapefruit transparent fruit juice | mass % |  |  |  |  |  |  |
| Mango transparent fruit juice | mass % |  |  |  |  | 45.00 |  |
| Peach transparent fruit juice | mass % |  |  | 70.00 |  |  |  |
| Pear transparent fruit juice | mass % |  | 10.00 |  |  |  |  |
| Perfume | mass % | 0.10 | 0.10 | 0.10 | 0.10 | 0.10 | 0.10 |
| Pure water | mass % | Adjusted | Adjusted | Adjusted | Adjusted | Adjusted | Adjusted |
| Total amount | mass % | 100.00 | 100.00 | 100.00 | 100.00 | 100.00 | 100.00 |
| Theogallin | ppm | 9 | 9 | 12 | 18 | 25 | 28 |
| Theaflavins | ppm | 4.7 | 4.7 | 6.3 | 6.1 | 9.6 | 9.5 |
| K | ppm | 751 | 100 | 1004 | 149 | 459 | 200 |
| Bx | % | 13 | 10 | 15 | 8 | 12 | 10 |
| Specific gravity |  | 1.053 | 1.040 | 1.061 | 1.032 | 1.048 | 1.040 |
| Brix of fruit juice/Brix of black tea |  | 50.69 | 10.14 | 38.10 | 29.03 | 24.17 | 10.91 |
| Theogallin/K |  | 0.012 | 0.090 | 0.012 | 0.121 | 0.054 | 0.140 |
| Theogallin/Theaflavins |  | 1.935 | 1.935 | 1.905 | 2.956 | 2.604 | 2.963 |
| Feeling of fruit juice |  | ◎ | Δ | ◎ | ○ | ◎ | ○ |
| Feeling of black tea |  | Δ | Δ | ○ | ○ | Δ | X |
| Balance |  | X | X | Δ | Δ | Δ | X |

(Discussion)

From the results of Tables 1A-2B, it was found out that prescribing the theogallin amount, and the ratio of the content of theogallin with respect to the content of potassium (theogallin/K) in a fruit-juice-containing black tea beverage packed in a container largely containing fruit juice, allow the beverage to have appropriate feeling of fruit juice along with feeling of black tea, and have good balance of them, and have small change of color tone with age.

More specifically, it can be considered that prescribing the content of theogallin to a range of 10 ppm to 24 ppm, and the ratio of the content of theogallin with respect to the content of potassium (theogallin/K) to 0.015 to 0.100 in a fruit-juice-containing black tea beverage that contains 10 to 90 mass % of fruit juice, allow the fruit-juice-containing black tea beverage packed in a container to suppress time deterioration, and have the taste of black tea (feeling of black tea) and the flavor of fruit juice (feeling of fruit juice) sufficiently without performing enzyme treatment such as tannase treatment.

Furthermore, from the results of Tables 1A-2B, it was found out that prescribing the ratio of the content of theogallin with respect to the content of theaflavins (theogallin/theaflavins) allows the beverage to have appropriate feeling of black tea, and have further small change of color tone with age.

From such points, it is considered that the ratio of the content of theogallin with respect to the content of theaflavins (theogallin/theaflavins) being 1 to 15 allows the beverage to have appropriate feeling of black tea and further have small change of color tone with age.

Examples 10 to 17

The black tea beverage packed in a container (sample) was obtained similarly to Example 1 except that the amount of the black tea leaves, and the kind and the amount of the fruit juice, and the like were changed as shown in Tables 3A and 3B.

Furthermore, any amount of the fruit juice is an amount converted to straight.

(Sensory Examination 2)

With respect to the beverages obtained in Examples 10 to 17 (at a temperature of 25° C.), the same 5 examiners (panelists) gave a score for the 4 items of odor note, thick aftertaste, flavor with age and total evaluation in 4-step evaluation of 1 to 4 on the following criteria, and the average points of the 5 examiners were evaluated such that "⊚ (double circle)" indicates 3.5 or more, "○(circle)" indicates 3 or more and less than 3.5, "Δ (triangle)" indicates 2 or more and less than 3, and "x (cross)" indicates 1 or more and less than 2.

=Odor Note=

The odor note through the nose was evaluated on the following criteria.
4: Particularly good
3: Good
2: Normal
1: Not enough =Thick Aftertaste=

The thick taste (not watery) and the aftertaste were evaluated on the following criteria.
4: Particularly good
3: Good
2: Normal
1: Bad =Flavor with Age=

The black tea beverage packed in a container obtained in Examples and Comparative Examples was stored under sunless environment at a temperature of 25° C. and a humidity of 30% for 60 days, and then the change of the flavor was observed and evaluated on the following criteria.
4: Particularly good
3: Good
2: slight deterioration
1: significant deterioration =Total Evaluation=

The total performance as a beverage in consideration of each of the evaluations for the flavor and the change with age with age was evaluated on the following criteria.
4: Particularly good
3: good
2: Normal
1: No good

TABLE 3

| Blend | | Unit | Example 10 | Example 11 | Example 12 | Example 13 | Example 14 | Example 15 | Example 16 | Example 17 |
|---|---|---|---|---|---|---|---|---|---|---|
| Blend | Sri Lanka Blend | mass% | 0.52 | | 0.42 | 0.35 | 0.45 | 0.35 | 0.35 | 0.35 |
| | Darjeeling | mass % | | | | 0.16 | | 0.16 | | 0.20 |
| | Nilgiri | mass% | | 0.22 | | | | | | |
| | Extract of black tea | mass % | | | | | | | | |
| | VC | mass % | 0.03 | 0.03 | 0.03 | 0.03 | 0.03 | 0.03 | 0.03 | 0.03 |
| | Citric acid | mass % | 0.02 | 0.02 | 0.07 | 0.11 | 0.06 | 0.05 | 0.01 | 0.04 |
| | Granulated sugar | mass % | 4.60 | 8.98 | 7.00 | 5.80 | 9.20 | 7.60 | 8.35 | 8.00 |
| | Sodium biacarbonate | mass % | Adjusted | Adjusted | Adjusted | Adjusted | Adjusted | Adjusted | Adjusted | Adjusted |
| | Apple transparent fruit juice | mass % | 60.00 | | | | | 40.00 | | |
| | White grape transparent fruit juice | mass % | | | | 80.00 | | | | |
| | Orange transparent fruit juice | mass % | | | | | | | | |
| | Strawberry transparent fruit juice | mass % | | | | | | | 30.00 | |
| | Grapefruit transparent fruit juice | mass % | | 18.00 | | | | | | |
| | Mango transparent fruit juice | mass % | | | | | | | | 20.00 |
| | Peach transparent fruit juice | mass % | | | 20.00 | | | | | |

TABLE 3-continued

| | | Unit | Example 10 | Example 11 | Example 12 | Example 13 | Example 14 | Example 15 | Example 16 | Example 17 |
|---|---|---|---|---|---|---|---|---|---|---|
| | Pear transparent fruit juice | mass % | | | | | 40.00 | | | |
| | Perfume | mass % | 0.10 | 0.10 | 0.10 | 0.10 | 0.10 | 0.10 | 0.10 | 0.10 |
| | Pure water | mass % | Remainder | Remainder | Remainder | Remainder | Remainder | Remainder | Remainder | Remainder |
| | Total amount | mass % | 100.00 | 100.00 | 100.00 | 100.00 | 100.00 | 100.00 | 100.00 | 100.00 |
| Analyzed value | Theogallin | ppm | 15 | 10 | 12 | 15 | 13 | 18 | 10 | 20 |
| | Theaflavins | ppm | 7.8 | 2.3 | 6.3 | 6.7 | 6.8 | 6.7 | 5.3 | 7.1 |
| | K | ppm | 445 | 227 | 287 | 265 | 398 | 297 | 362 | 204 |
| | Mg | ppm | 18.2 | 11.2 | 12.4 | 24.5 | 22.3 | 12.1 | 28.8 | 10.7 |
| | Bx | % | 11 | 11 | 9 | 15 | 14 | 12 | 11 | 11 |
| | Specific gravity | | 1.044 | 1.044 | 1.036 | 1.061 | 1.057 | 1.048 | 1.044 | 1.044 |
| | Brix of fruit juice/Brinx of black tea | | 32.97 | 24.55 | 10.88 | 51.61 | 27.94 | 32.70 | 18.37 | 20.23 |
| | Theogallin/K | | 0.034 | 0.044 | 0.042 | 0.057 | 0.033 | 0.061 | 0.028 | 0.098 |
| | Theogallin/Mg | | 0.825 | 0.893 | 0.966 | 0.613 | 0.582 | 1.485 | 0.347 | 1.869 |
| | Theogallin/Theaflavins | | 1.923 | 4.329 | 1.905 | 2.242 | 1.926 | 2.691 | 1.905 | 2.837 |
| Evaluation | Oder note | | ○ | ⊚ | ⊚ | ○ | ○ | ⊚ | Δ | ⊚ |
| | Thick aftertaste | | ⊚ | Δ | Δ | ○ | ○ | Δ | Δ | Δ |
| | Flavor with age | | ○ | ⊚ | ⊚ | ○ | ○ | ⊚ | Δ | Δ |
| | Total evaluation | | ⊚ | ○ | ○ | ○ | ○ | ○ | Δ | Δ |

From the results of Tables 3A and 3B, it was found out that further prescribing the ratio of the content of theogallin with respect to the content of magnesium (theogallin/Mg) allows the beverage to have good odor note, and have appropriate thick and palatable aftertaste, and have small change of flavor with age.

From such points and additional viewpoints such as the odor note, the thick aftertaste and flavor with age, it is considered that the ratio of the content of theogallin with respect to the content of magnesium (theogallin/Mg) is preferably 0.4 to 1.7, particularly preferably 0.5 or more and 1.2 or less, and further particularly preferably 0.6 or more and 0.9 or less.

The invention claimed is:

1. A fruit-juice-containing black tea beverage packed in a container, comprising:
    extraction liquid of black tea; and
    10 to 90 mass % of fruit juice,
    wherein a content of theogallin in the fruit juice containing black tea beverage is 10 ppm to 24 ppm, and
    wherein a ratio of the content of theogallin to a content of potassium in the fruit juice containing black tea beverage is 0.015 to 0.100.

2. The fruit-juice-containing black tea beverage packed in a container according to claim 1, wherein a ratio of the content of theogallin to a content of magnesium is 0.4 to 1.7.

3. The fruit-juice-containing black tea beverage packed in a container according to claim 1, wherein a content of potassium in the fruit-juice-containing black tea beverage is 190 ppm to 700 ppm.

4. The fruit-juice-containing black tea beverage packed in a container according to claim 1, wherein a content of magnesium in the fruit-juice-containing black tea beverage is 15 ppm to 25 ppm.

5. A method for producing a fruit-juice-containing black tea beverage packed in a container, the method comprising:
    performing at least one of: (i) blending an extraction liquid of black tea with fruit juice to form a mixture that comprises 10 to 90 mass % of the fruit juice, wherein a type and an amount of the extraction liquid of black tea and a type and an amount of the fruit juice are selected such that a content of theogallin in the mixture is 10 ppm to 24 ppm and such that a ratio of the content of theogallin to a content of potassium in the mixture is 0.015 to 0.100, and (ii) blending an extraction liquid of black tea with fruit juice to form a mixture that comprises 10 to 90 mass % of the fruit juice, adding at least one of theogallin and potassium to the mixture such that a content of theogallin in the mixture is 10 ppm to 24 ppm and such that a ratio of the content of theogallin to a content of potassium in the mixture is 0.015 to 0.100; and
    filling a container with the mixture.

6. A method for suppressing change of color with age in a fruit-juice-containing black tea beverage packed in a container, the method comprising:
    performing at least one of: (i) blending an extraction liquid of black tea with fruit juice to form a mixture that comprises 10 to 90 mass % of the fruit juice, wherein a type and an amount of the extraction liquid of black tea and a type and an amount of the fruit juice are selected such that a content of theogallin in the mixture is 10 ppm to 24 ppm and such that a ratio of the content of theogallin to a content of potassium in the mixture is 0.015 to 0.100, and (ii) blending an extraction liquid of black tea with fruit juice to form a mixture that comprises 10 to 90 mass % of the fruit juice, adding at least one of theogallin and potassium to the mixture such that a content of theogallin in the mixture is 10 ppm to 24 ppm and such that a ratio of the content of theogallin to a content of potassium in the mixture is 0.015 to 0.100; and
    filling a container with the mixture.

* * * * *